United States Patent
Lee

(10) Patent No.: US 11,880,997 B2
(45) Date of Patent: Jan. 23, 2024

(54) METHOD AND APPARATUS WITH POSE ESTIMATION

(71) Applicant: Samsung Electronics Co., Ltd., Suwon-si (KR)

(72) Inventor: Wonhee Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 250 days.

(21) Appl. No.: 17/321,952

(22) Filed: May 17, 2021

(65) Prior Publication Data
US 2022/0067955 A1   Mar. 3, 2022

(30) Foreign Application Priority Data

Aug. 28, 2020 (KR) .................. 10-2020-0109697
Nov. 18, 2020 (KR) .................. 10-2020-0154882

(51) Int. Cl.
*G06T 7/00* (2017.01)
*G06T 7/70* (2017.01)
(Continued)

(52) U.S. Cl.
CPC .......... *G06T 7/70* (2017.01); *G06N 3/045* (2023.01); *G06N 3/08* (2013.01); *G05D 1/0231* (2013.01);
(Continued)

(58) Field of Classification Search
CPC .......... G06N 3/08; G06N 3/045; G06N 3/088; G06T 2207/10016; G06T 2207/10028;
(Continued)

(56) References Cited

U.S. PATENT DOCUMENTS

2019/0080166 A1   3/2019   Zhu et al.
2019/0080167 A1   3/2019   Zhu et al.
(Continued)

FOREIGN PATENT DOCUMENTS

KR   10-2020-0042760 A   4/2020
KR   10-2020-0094643 A   8/2020
KR   10-2020-0094655 A   8/2020

OTHER PUBLICATIONS

Geng et al, Unsupervised Learning-based Depth Estimation aided Visual SLAM Approach, arXiv:1901.07288v1 (Year: 2019).*
(Continued)

*Primary Examiner* — Ping Y Hsieh
*Assistant Examiner* — Xiao Liu
(74) *Attorney, Agent, or Firm* — NSIP Law

(57) ABSTRACT

A method and apparatus with pose estimation, where the method may include obtaining, using a depth network, a respective depth image for each of a plurality of successive input images, obtaining, using a pose network, respective image pose transformation matrices between images, of the successive input images, at adjacent time points, obtaining, based on initial pose information and the respective image pose transformation matrices, image pose information for each of the adjacent times, estimating final pose information dependent on the obtained image pose information, accumulating the image pose transformation matrices, calculating a pose loss value based on a result of comparing image position information, obtained from a result of the accumulating, and sensor position information obtained from a sensor. The pose and depth networks may be updated based on the pose loss value and a composite loss value dependent on the image pose transformation matrices and the input images.

25 Claims, 7 Drawing Sheets

(51) Int. Cl.
*G06N 3/08* (2023.01)
*G06N 3/045* (2023.01)
*G05D 1/02* (2020.01)

(52) U.S. Cl.
CPC ............... *G06T 2207/10028* (2013.01); *G06T 2207/20081* (2013.01); *G06T 2207/20084* (2013.01); *G06T 2207/30244* (2013.01); *G06T 2207/30252* (2013.01)

(58) Field of Classification Search
CPC . G06T 2207/30252; G06T 7/73; G06T 7/246; G06T 7/70; G06T 7/30; G06T 7/269; G06T 2207/20081; G06T 2207/30244; G06T 3/60; G06T 3/0075; G06F 17/16; G06V 10/82; G06V 20/58; G05D 1/0231; G05D 2201/0213; G05D 1/0278
See application file for complete search history.

(56) References Cited

U.S. PATENT DOCUMENTS

| | | | |
|---|---|---|---|
| 2019/0080470 A1 | 3/2019 | Zhu et al. | |
| 2019/0108651 A1 | 4/2019 | Gu et al. | |
| 2019/0221033 A1 | 7/2019 | Messerlie et al. | |
| 2020/0150677 A1 | 5/2020 | Walters et al. | |
| 2020/0211206 A1 | 7/2020 | Wang et al. | |
| 2021/0118184 A1* | 4/2021 | Pillai | G06N 3/0418 |
| 2021/0144355 A1 | 5/2021 | Kim et al. | |
| 2021/0398301 A1* | 12/2021 | Guizilini | G06T 7/50 |

OTHER PUBLICATIONS

Li et al., UnDeepVO: Monocular Visual Odometry through Unsupervised Deep Learning, 2018 IEEE International Conference on Robotics and Automation (ICRA) May 21-25, 2018.*

Zhou, et al. "Unsupervised learning of depth and ego-motion from video." *Proceedings of the IEEE conference on computer vision and pattern recognition.* 2017. (10 pages in English).

Wang, et al. "DeepVO: Towards end-to-end visual odometry with deep recurrent convolutional neural networks." *2017 IEEE International Conference on Robotics and Automation (ICRA).* IEEE, 2017. (8 pages in English).

Li, et al. "UnDeepVO: Monocular visual odometry through unsupervised deep learning." *2018 IEEE international conference on robotics and automation (ICRA).* IEEE, 2018. (6 pages in English).

* cited by examiner

METHOD AND APPARATUS WITH POSE ESTIMATION

CROSS-REFERENCE TO RELATED APPLICATIONS

This application claims the benefit under 35 USC § 119(a) of Korean Patent Application No. 10-2020-0109697 filed on Aug. 28, 2020, and Korean Patent Application No. 10-2020-0154882 filed on Nov. 18, 2020, in the Korean Intellectual Property Office, the entire disclosures of which are incorporated herein by reference for all purposes.

BACKGROUND

1. Field

The following description relates to a vehicle or other apparatuses and methods with pose estimation.

2. Description of Related Art

Visual odometry refers to a method of calculating a current position by accumulating a relative position of a camera for each frame that is input through the camera fixed to a moving object. Visual odometry is classified into monocular visual odometry that uses a single camera and stereo visual odometry that uses two or more cameras.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method includes obtaining, using a depth network, a respective depth image for each of a plurality of successive input images, obtaining, using a pose network, respective image pose transformation matrices between images, of the successive input images, at adjacent time points, obtaining, based on initial pose information and the respective image pose transformation matrices, image pose information for each of the adjacent times, estimating final pose information dependent on the obtained image pose information for each of the adjacent times, accumulating the image pose transformation matrices, and calculating a pose loss value based on a result of comparing image position information, obtained from a result of the accumulating, and sensor position information obtained from a sensor.

The method may further include training the pose network dependent on the calculated pose loss value.

The method may further include training the depth network dependent on the calculated pose loss value.

The sensor may be a global positioning system (GPS) or an indoor position sensor.

The method may further include recurrently calculating a gradient of the image position information included in the pose loss value, wherein the training of the pose network and the training of the depth network may both be dependent on the recurrently calculated gradient.

The obtaining, using the pose network, of the respective image pose transformation matrices may include obtaining respective image pose transformation matrices between pairs of images at corresponding adjacent time points from the successive input images, and obtaining respective inverse image pose transformation matrices between the pairs of images, where the method may further include calculating a composite loss value based on respective comparisons for each time point of a corresponding inverse input image and a composite image generated using a corresponding image pose transformation matrix applied to a successive image of the corresponding image, and respective comparisons for each time point of the successive image and a composite image generated using a corresponding image pose transformation matrix applied to the corresponding image, and updating training of the depth network and the pose network based on a total loss value calculated from the composite loss value and the pose loss value.

The method may be a method of a vehicle, and the sensor may be a position sensor of the vehicle, where the method may further include repeating, for each of a plurality of position samplings of the position sensor, the obtaining of the respective depth images, the obtaining of the respective image pose transformation matrices, the obtaining of the image pose information, and the calculating of the pose loss value, where the method may further include generating the pose network by updating training, of a previous pose network, dependent on a result of one of the repeated calculating of the pose loss value that is based on a corresponding one of the plurality of position samplings.

The updating of the training of the previous pose network may be performed offline or online.

The vehicle may control operations of the vehicle dependent on at least the estimated final pose information.

In one general aspect, one or more embodiments includes a non-transitory computer-readable storage medium storing instructions that, when executed by a processor, cause the processor to perform any, any combination, or all operations and/or methods described herein.

In one general aspect, a processor-implemented method includes obtaining, using a depth network, a respective depth image for each of a plurality of successive input images, obtaining, using a pose network, respective image pose transformation matrices, and respective inverse image pose transformation matrices, between images, of the successive input images, at adjacent time points, calculating a composite loss value based on respective comparisons for each time point of a corresponding input image and a composite image generated using a corresponding inverse image pose transformation matrix applied to a successive image of the corresponding image, and respective comparisons for each time point of the successive image and a composite image generated using a corresponding image pose transformation matrix applied to the corresponding image, calculating a pose loss value based on a result of comparing image position information, obtained from a result of an accumulating of the image pose transformation matrices, and sensor position information obtained from a sensor, and updating training of the depth network and the pose network based on a total loss value calculated from the composite loss value and the pose loss value.

The calculating of the pose loss value may include obtaining the sensor position information from sensor information at two time points, with an interval of a sensing period being between the two time points, obtaining the image position information by performing the accumulating of the image pose transformation matrices during the sensing period, and calculating the pose loss value by comparing the sensor position information and the obtained image position information.

The obtaining of the sensor position information may include obtaining a sensor pose transformation matrix from the sensor information at the two time points, and obtaining the sensor position information by multiplying initial position information and the sensor pose transformation matrix.

The obtaining of the image position information may include obtaining a cumulative transformation matrix by cumulatively multiplying the image pose transformation matrices at the adjacent time points, and obtaining the image position information by multiplying the initial position information and the cumulative transformation matrix.

The updating may include calculating the total loss value by calculating a weighted average of the composite loss value and the pose loss value, calculating a gradient of the total loss value, and updating the training of the depth network and the pose network such that the gradient of the total loss value decreases.

The calculating of the gradient of the total loss value may include calculating a gradient of the pose loss value, and calculating the gradient of the total loss value by calculating a weighted average of the gradient of the pose loss value and a gradient of the composite loss value.

The calculating of the gradient of the pose loss value may include recurrently calculating a gradient of the image position information included in the pose loss value.

The recurrent calculating may include obtaining an image pose transformation matrix from a first time point toward a second time point by inputting a first input image of the first time point and a second input image of the second time point to the pose network, obtaining a gradient of the image pose transformation matrix from the first time point toward the second time point, obtaining a gradient of image position information of the second time point based on image position information of the first time point, the gradient of the image pose transformation matrix from the first time point toward the second time point, the image pose transformation matrix from the first time point toward the second time point, and a gradient of the image position information of the first time point, and obtaining the image position information of the second time point by multiplying the image position information of the first time point by the image pose transformation matrix from the first time point toward the second time point.

The sensor may be a global positioning system (GPS) or an indoor position sensor.

In one general aspect, an apparatus includes a position sensor, and one or more processors configured to obtain, using a depth network, a respective depth image for each of a plurality of successive input images, obtain, using a pose network, respective image pose transformation matrices between images, of the successive input images, at adjacent time points, obtain, based on initial pose information and the respective image pose transformation matrices, image pose information for each of the adjacent times, estimate final pose information dependent on the obtained image pose information for each of the adjacent times, accumulate the image pose transformation matrices, and calculate a pose loss value based on a result of comparing image position information, obtained from a result of the accumulating, and sensor position information obtained from the position sensor.

The position sensor may be a global positioning system (GPS) or an indoor position sensor.

The one or more processors may be further configured to train the pose network dependent on the calculated pose loss value.

The one or more processors may be further configured to train the depth network dependent on the calculated pose loss value.

The apparatus may be a vehicle, and the one or more processors may be further configured to repeat, for each of a plurality of position samplings of the position sensor, the obtaining of the respective depth images, the obtaining of the respective image pose transformation matrices, the obtaining of the image pose information, and the calculating of the pose loss value, and generate the pose network by updating training, of a previous pose network, dependent on a result of one of the repeated calculating of the pose loss value that is based on a corresponding one of the plurality of position samplings.

The one or more processors may be configured to, for the obtaining of the respective image pose transformation matrices, obtain respective image pose transformation matrices between pairs of images at corresponding adjacent time points from the successive input images, and obtain respective inverse image pose transformation matrices between the pairs of images, calculate a composite loss value based on respective comparisons for each time point of a corresponding input image and a composite image generated using a corresponding inverse image pose transformation matrix applied to a successive image of the corresponding image, and respective comparisons for each time point of the successive image and a composite image generated using a corresponding image pose transformation matrix applied to the corresponding image, and update training of the depth network and the pose network based on a total loss value calculated from the composite loss value and the pose loss value.

In one general aspect, a vehicle may include a position sensor, and one or more processors configured to, with respect to each of a plurality of position samplings by the position sensor, repeat an obtaining, using a pose network, of respective image pose transformation matrices, and respective inverse image pose transformation matrices, between images of a plurality of input images, an obtaining of image pose information dependent on the respective image pose transformation matrices, a calculating of a composite loss value dependent on the respective image pose transformation matrices, the respective inverse image pose transformation matrices, the plurality of input images, and respective depth images for the plurality of input images, an obtaining of image position information dependent on a result of an accumulating of the respective image pose transformation matrices, and a calculation of a pose loss value dependent on the obtained image position information and sensor position information from the position sensor, and the one or more processors are configured updating training of the pose network dependent on a result of one of the repeated calculations of the composite loss value and the pose loss value for a corresponding one of the plurality of position samplings.

Other features and aspects will be apparent from the following detailed description, the drawings, and the claims.

BRIEF DESCRIPTION OF THE DRAWINGS

Throughout the drawings and the detailed description, the same reference numerals refer to the same or like elements. The drawings may not be to scale, and the relative size, proportions, and depiction of elements in the drawings may be exaggerated for clarity, illustration, and convenience.

DETAILED DESCRIPTION

Figure 1:
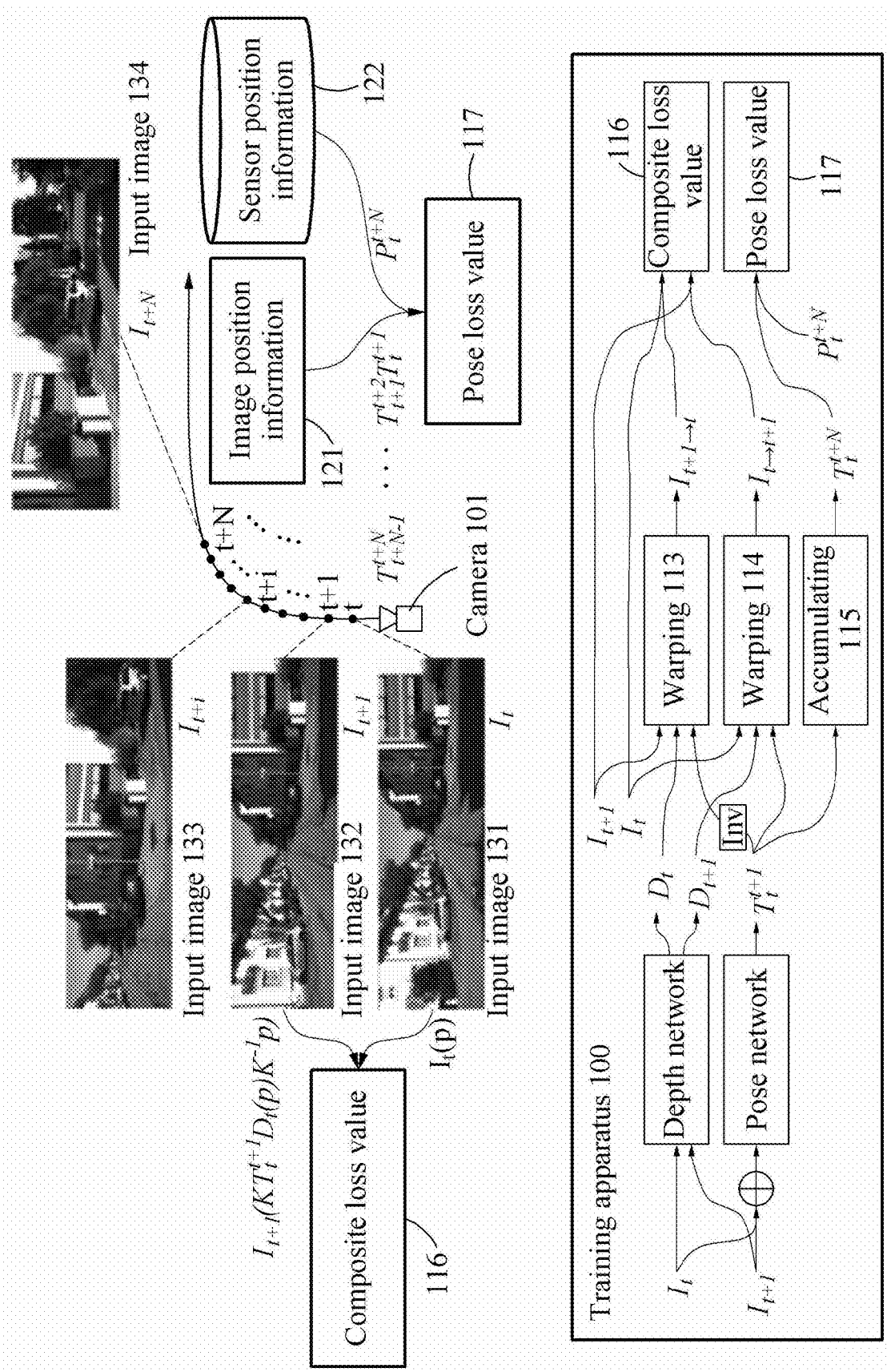
FIG. 1 illustrates an example training of an apparatus with pose estimation information.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the present disclosure may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. In addition, the use of the term "may" herein with respect to an example or embodiment (e.g., as to what an example or embodiment may include or implement) means that at least one example or embodiment exists where such a feature is included or implemented, while all examples are not limited thereto.

In addition, terms such as first, second, A, B, (a), (b), and the like may be used herein to describe components. Each of these terminologies is not used to define an essence, order, or sequence of a corresponding component but used merely to distinguish the corresponding component from other component(s).

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Also, in the description of example embodiments, detailed description of structures or functions that are thereby known after an understanding of the disclosure of the present application may be omitted when it is deemed that such description may result in an ambiguous interpretation of the example embodiments.

FIG. 1 illustrates an example training of an apparatus with pose estimation information. The apparatus with pose estimation will be hereinafter referred to as a pose information estimating apparatus, though such a reference is only for simplicity of description and not for diminution in scope.

In an example, the pose information estimating apparatus may estimate pose information based on an image sequence, which is a sequence of images captured by a monocular camera. The pose information estimating apparatus may generate a depth image and image pose information based on the image sequence, and estimate depth information from the depth image and estimate final pose information based on the image pose information.

Pose information described herein may include position information and rotation information. The position information may include three-dimensional (3D) information of x, y, and z axes, and the rotation information may include 3D information of yaw, roll, and pitch. The pose information may correspond to pose information of the camera (e.g., a camera 101) configured to capture the image or the image sequence. In an example where the pose information estimating apparatus is a vehicle, the camera may be a component of the vehicle, and thus, the pose information may correspond to pose information of the vehicle.

The pose information estimating apparatus may generate the depth image and the image pose information using a depth network and a pose network. The depth image may also be referred to as a depth map. The image pose information may refer to pose information that is estimated from the image sequence through the pose network. In addition, image position information may refer to position information that is estimated from the image sequence through the pose network. The depth network and the pose network may be trained before being provided in the pose information estimating apparatus, e.g., before being stored or available in memory of the pose information estimating apparatus, and the currently trained networks may also be updated (e.g., further trained) after being provided in the pose information estimating apparatus, e.g., the depth network and/or the pose network may be updated in an online training in the pose information estimating apparatus and the updated depth and/or pose networks would then be stored and available for implementation.

A training apparatus (e.g., a training apparatus 100) may train the depth network and the pose network based on training data. The training data may include an image sequence and sensor position information. The depth network and the pose network may be trained through an unsupervised (self-supervised) learning method. The image sequence that is used for the training may be unlabeled data in which ground truth, or a correct answer, is not represented, provided, or available. By adopting the unsupervised learning method, which is different from a supervised learning method that requires pre-knowledge of the ground truth pose information for all image frames, it may be possible to train the depth network and the pose network in the training apparatus 100 at a more reduced cost compared to a supervised learning approach.

The sensor position information 122 may refer to position information that is estimated by a sensor. The sensor may include a global positioning system (GPS) or an indoor position sensor. The GPS may be suitable for the estimation of outside position information, and the indoor position sensor may be suitable for the estimation of precise inside position information. The indoor position sensor may be, for example, a system configured to output position information corresponding to a quick response (QR) code indicated on a captured image of an indoor wall in a case of capturing the indoor wall. However, the sensor is not limited to the foregoing examples and may include any systems that generate position information.

A neural network included in the pose information estimating apparatus may be trained using the sensor position information in addition to an input image of a monocular camera (e.g., the camera 101). Thus, the pose information estimating apparatus may estimate pose information in an absolute scale (e.g., as an absolute truth factor or component), while an output of a network trained without labeled data, with only a training input image of the monocular camera, would lack such an absolute scale and thus the trained network would be imprecise. Using an indoor or outdoor sensor, sensor position information may be obtained in an absolute scale, and thus the absolute scale may be applied to the training of the neural network using the sensor position information, e.g., the sensor position information 122. The absolute scale may also be applied to depth image and image pose information output through the neural network to which the absolute scale is applied.

Consideration of the image position information (e.g., image position information 121) that is estimated from the image sequence and the sensor position information (e.g., sensor position information 122) that is estimated from the sensor may be combined. For example, the image position information and the sensor position information may be compared. In such a process of comparing, the sensor position information may be used as ground truth of the corresponding unlabeled image sequence from which the image position information was estimated. Thus, the sensor position information from a sensor of the pose information estimating apparatus (or the training apparatus 100) may be used to provide a self-supervised learning to the pose network, which may be propagated to the depth network, thereby improving the accuracy in estimation of the depth image.

For the comparing, the image position information and the sensor position information may be synchronized. However, the sensor position information may also be obtained less frequently than the image sequence is obtained. For example, a general image sensor may obtain an image at a frequency of 30 frames per second, whereas a GPS may obtain position information once per second. Thus, while some examples include such position sensors, such as GPS, that senses such position information on the basis of a shorter period, e.g., at the frequency of the 30 frames per second of the camera 101, other examples may include such positions sensors, such as another GPS, of lesser expense that may be provided in some less expensive vehicle or mobile terminal embodiments, e.g., compared to potentially more expensive to manufacture vehicle or mobile terminal embodiments. While such examples are described with respect to the different GPS sensors, examples are not limited thereto.

Accordingly, in an example, the training apparatus may consider the sensor position information and an input image that have different frequencies. The training apparatus may accumulate input images that are input/captured relatively frequently according to the period of the sensor position information. The training apparatus may train the neural network based on respective comparing of information of the accumulated input images and the sensor position information.

In addition, in one or more examples, the monocular camera and the position sensor may be components of vehicle or mobile terminal embodiments, as merely non-limiting examples of pose information estimating apparatuses. In such examples, the depth network and the pose network may be trained online, as well as offline, through the image sequence and the sensor position information that are collected while the vehicle or the mobile terminal is being operated. For example, while outputs of the depth network and the pose network may be used at a current time by the vehicle as a current pose estimation, such as with current autonomous driving of the vehicle, the depth network and the pose network may also be further trained based on the captured images and sensor position information, online and/or offline.

One or more examples include the pose information estimating apparatus being implemented in various fields that use a monocular camera. One or more examples also include the pose information estimating apparatus being implemented in visual odometry included embodiments that estimate pose information from a monocular view image sequence. The pose information estimating apparatus may estimate position information to which an absolute scale is applied through the position sensor. The pose information estimating apparatus may be used for the estimation of outside or outdoor pose information. For example, the pose information estimating apparatus may be the vehicle with autonomous driving capabilities, e.g., dependent on the estimated pose information. The pose information estimating apparatus may be used for the estimation of inside or indoor pose information. For example, the pose information estimating apparatus may be for a mobile terminal example that estimates pose information through the mobile terminal. However, the pose information estimating apparatus may not be limited to the foregoing examples, and may be applicable to all types of estimation of position information that uses a monocular view image and a position sensor.

Referring to FIG. 1, the training apparatus 100 may receive an image sequence of images captured by the camera 101 and received sequentially. As illustrated, the image sequence may include an input image $I_t$ 131, an input image $I_{t+1}$ 132, an input image $I_{t+i}$ 133, and an input image $I_{t+N}$ 134, in which i denotes a natural number greater than or equal to 1 and less than or equal to N, and N denotes a natural number greater than or equal to 1. The depth network may receive the image sequence and estimate a depth image. For example, the depth network may estimate depth images $D_t$ and $D_{t+1}$ from two successive frames $I_t$ and $I_{t+1}$. Here, the images may indicate successive image frames.

The pose network may generate an image pose transformation matrix $T_t^{t+1}$ between the two successive frames $I_t$ and $I_{t+1}$. An image pose transformation matrix described herein may refer to a transformation matrix associated with pose information between successive frames in sequential order. The training apparatus 100 may also generate an inverse image pose transformation matrix $T_{t+1}^{t}$. An inverse image pose transformation matrix described herein may refer to a transformation matrix associated with pose information between successive frames in inverse order.

The training apparatus 100 may generate a composite image $I_{t \to t+1}$ of a subsequent time point from an input image $I_t$ of a current time point through the image pose transformation matrix $T_t^{t+1}$, input image $I_t$ and depth map. For example, a warping operation 114, the training apparatus 100 may generate the composite image $I_{t \to t+1}$ of the subsequent time point from a depth image $D_{t+1}$ of the subsequent time point and the input image $I_t$ of the current time point.

The training apparatus 100 may generate a composite image $I_{t+1 \to t}$ of the current time point from an input image $I_{t+1}$ of the subsequent time point through the inverse image pose transformation matrix $T_{t+1}^{t}$. In a warping operation 113, the training apparatus 100 may generate the composite image $I_{t+1 \to t}$ of the current time point from a depth image $D_t$ of the current time point and the input image $I_{t+1}$ of the subsequent time point.

The training apparatus 100 may compare each composite image to the corresponding input image of a corresponding time point. For example, the training apparatus 100 may compare the input image $I_t$ of the current time point and the composite image $I_{t+1 \to t}$ of the current time point that is a result of the transformation of operation 113 of the input image $I_{t+1}$ of the subsequent time point. For example, the composite image $I_{t+1 \to t}$ of the current time point may be calculated as represented by the below Equation 1, for example.

$$I_{t+1}(KT_t^{t+1}D_t(p)K^{-1}p) \quad \text{Equation 1}$$

In Equation 1, p indicates a pixel in the input image $I_{t+1}$ and the composite image $I_{t \to t+1}$, and K indicates a camera intrinsics matrix of the camera 101. The training apparatus 100 may also similarly compare the input image $I_{t+1}$ of the subsequent time point and the composite image $I_{t \to t+1}$ of the subsequent time point that is transformed from the input image $I_t$ of the current time point.

To compare each composite image and corresponding input image of the corresponding time, the training apparatus 100 may calculate a composite loss value 116. The composite loss value 116 may reflect therein a photometric dissimilarity between an input image and a corresponding composite image. The composite loss value 116 may also be a self-supervised loss in that it is learned based on homogeneous input data.

The sensor position information 122 may be obtained at a frequency less than a frequency by which the image sequence is obtained. Referring to FIG. 1, the sensor position information 122 may be obtained on the basis of a period which is N, while image frames may be obtained on the basis of a period which is 1. To match or synchronize times at which the image position information 121 and the sensor position information 122 are obtained, the image position information 121 having a shorter period may be accumulated.

In an accumulating operation 115, the training apparatus 100 may accumulate image pose transformation matrices from a start time point t to a time point t+N. For example, the training apparatus 100 may accumulate image pose transformation matrices $T_t^{t+1}$, $T_{t+1}^{t+2}$, ..., and $T_{t+N+1}^{t+N}$ between images of adjacent time points. The training apparatus 100 may calculate $T_{T+N-1}^{T+N} \ldots T_{t+1}^{t+2}T_t^{t+1}$, multiplying the image pose transformation matrices between the images of the adjacent time points. A result of the calculating may be represented as $T_t^{t+N}$.

The training apparatus 100 may compare position information obtained from synchronized heterogeneous sensors. The training apparatus 100 may compare $T_t^{t+N}$ and $P_t^{t+N}$.

$P_t^{t+N}$ denotes a sensor pose transformation matrix obtained based on the sensor position information 122 sensed at the time point t and the time point t+N. The sensor pose transformation matrix may refer to a transformation matrix between two sets of pose information obtained from a sensor. To compare the image position information 121 and the sensor position information 122, the training apparatus 100 may calculate a pose loss value 117.

The training apparatus 100 may calculate a total loss value based on the composite loss value 116 and the pose loss value 117. The total loss value may be calculated as represented by the below Equation 2, for example. The training apparatus 100 may calculate the total loss value by calculating a weighted average of the composite loss value 116 and the pose loss value 117.

$$\mathcal{L} = \sum_{t'=t}^{t+N-1} \mathcal{L}_{self}^{t'} + \lambda \mathcal{L}_{pos}^{t,t+N} \quad \text{Equation 2}$$

In Equation 2, $\mathcal{L}$ denotes the total loss value. $\mathcal{L}_{self}^{t'}$ denotes the composite loss value 116, and $\mathcal{L}_{pos}^{t,t+N}$ denotes the pose loss value 117 during the time t and t+N. The pose loss value 117 may be calculated as represented by the below Equation 3, for example.

$$\mathcal{L}_{pos}^{t,t+N} = \|T_{t+N-1}^{t+N} \ldots T_{t+1}^{t+2}T_t^{t+1}X_t - P_t^{t+N}X_t\|_2 \quad \text{Equation 3}$$

Based on the results of Equation 3, the parameters of the neural network may be updated such that a ground truth position change obtained from the sensor equals a cumulative change amount obtained by accumulating a predicted position change in each frame.

In Equation 3, $X_t$ denotes a position at a time point t, which is an initial position. $T_i^{i+1}$ denotes a pose transformation matrix that is predicted from an ith frame toward an i+1th frame. $P_t^{t+N}$ denotes a pose transformation matrix measured from a GPS sensor from the time point t to the time point t+N. The training apparatus 100 may calculate a gradient of the total loss value, and update the parameters of the neural network based on calculated gradient of the total loss value. For this, the training apparatus 100 may calculate a gradient of a parameter $\theta_p$ of the pose network of $e_{t+N}$. A portion corresponding to the composite loss value 116 in the gradient of the total loss value of the parameter $\theta_p$ of the pose network may be independent of the parameter $\theta_p$ of the pose network, and may thus be 0. A gradient of the pose loss value 117 may be represented by the below Equation 4, for example.

$$\nabla_{\theta_p} \mathcal{L}_{pos}^{t,t+N} = \nabla_{\theta_p} \|e_{t+N}\|_2 \quad \text{Equation 4}$$

-continued $$= \left(\nabla_{\theta_p} e_{t+N}\right)^T \frac{e_{t+N}}{\|e_{t+N}\|_2}$$

In Equation 4, $e_{t+N}$ denotes a difference between the image position information 121 and the sensor position information 122, which may be represented by the below Equation 5, for example.

$$e_{t+N} = T_{t+N-1}{}^{t+N} \ldots T_{t+1}{}^{t+2} T_t{}^{t+1} X_t - P_t{}^{t+N} X_t \quad \text{Equation 5:}$$

In Equation 4, the fraction portion of Equation 4 may be readily calculated. However, $\square_{\theta_p} e_{t+N}$ may not be readily calculated. In Equation 5, T in each of $T_{t+N-1}{}^{t+N} \ldots T_{t+1}{}^{t+2} T_t{}^{t+1}$ may have an independent parameter, and thus a direct gradient calculation may not be readily performed. In general, to calculate $\square_{\theta_p} e_{t+N}$ all at once, results of the pose network and neuron values for all inputs may need to be stored in a memory, and each of the inputs may be calculated in sequential order and not be calculated in parallel.

$$\nabla_{\theta_p} e_{t+N} = \nabla_{\theta_p} X_{t+N} \quad \text{Equation 6}$$

$$= \nabla_{\theta_p} \left( T_{t+N-1}^{t+N} X_{t+N-1} \right)$$

$$= X_{t+N-1}{}^T \nabla_{\theta_p} \left( T_{t+N-1}^{t+N\ T} \right) + T_{t+N-1}^{t+N} \nabla_{\theta_p} X_{t+N-1}$$

In an example, $\square_{\theta_p} e_{t+N}$ may be decomposed as represented by the above Equation 6, for example. In Equation 5, a gradient of $P_t{}^{t+N} X_t$ may become 0, and thus only a gradient of $T_{t+N-1}{}^{t+N} \ldots T_{t+1}{}^{t+2} T_t{}^{t+1} X_t$ may be left, which may be equal to $\square_{\theta_p} X_{t+N}$. $T_{t+N-1}{}^{t+N} X_{t+N-1}$ may be a representation of $X_{t+N}$ as a value of t+N−1. As a result, $\square_{\theta_p} X_{t+N}$ may be represented as a last row in Equation 6.

In the last row in Equation 6, $X_{t+M-1}$ may be simply calculated by multiplying each T from the time point t. $T_{t+N-1}{}^{t+N}$ may be simply obtained from an output of the pose network of the time point t+N. $\square_{\theta_p}(T_{t+N-1}{}^{t+N})$, which is a transposed gradient of $T_{t+N-1}{}^{t+N}$, may also be simply calculated. $\square_{\theta_p} X_{t+N-1}$ may not be readily calculated through a direct gradient calculation, but may be recurrently calculated by substituting $\square_{\theta_p} X_{t+N}$ in a second row in Equation 6. Such a process may be summarized in Table 1 below, for example.

TABLE 1

1: i ← t
2: X ← [0, 0, 0, 1]$^T$
3: $\nabla_{\theta_p} X \leftarrow 0$
4: for i < t + N do
5:     T, $\nabla_{\theta_p}$T ← PoseNet(I$_i$, I$_{i+1}$; $\theta_p$)
6:     $\nabla_{\theta_p} X \leftarrow X^T \nabla_{\theta_p}(T^T) + T \nabla_{\theta_p} X$
7:     X ← TX
8:     i ← i + 1
9: $e_{t+N} \leftarrow X_{t+N} - P_t{}^{t+N} X_t$
10: $\nabla_{\theta_p} \mathcal{L}_{pos}^{t,t+N} \leftarrow \left(\nabla_{\theta_p} X\right)^T \frac{e_{t+N}}{\|e_{t+N}\|_2}$ Referring to Table 1 above, the parameter $\theta_p$ of the pose network may be initialized. In a first row, a counter variable i may be initialized to t. In a second row, position information X may be initialized to an origin vector [0, 0, 0, 1]$^T$ of the camera 101. In a third row, $\square_{\theta_p} X$ may be initialized to 0. $\square_{\theta_p} X$ may be a Jacobian tensor, for example.

An image pose transformation matrix T may be a matrix in a dimension of 3×4 in which a rotation parameter in a dimension of 3×3 and a translation parameter in a dimension of 3×1 are combined. X denotes a four-dimensional vector (x, y, z, 1), in which x denotes a vertical position, y denotes a horizontal position, and z denotes a position in a progress (or traveling) direction. For example, a position of the camera 101 may be represented as (0, 0, 0, 1), and a position that precedes the camera 101 by 10 may be represented as (0, 0, 10, 1).

Fifth through eighth rows may be repeated until i becomes t+N. For example, when input images I$_i$ and I$_{i+1}$ at two adjacent time points and a parameter $\theta_p$ of the pose network are given, the pose network may output T, $\square_{\theta_p}$T. In the sixth row, $\square_{\theta_p} X$ may be updated to $X^T \square_{\theta_p}(T^T) + T \square_{\theta_p} X$. In the seventh row, image position information 121 X of a current time point may be updated to image position information 121 TX of a subsequent time point. In the eighth row, i may increase by 1.

After the repetition is terminated, $X_{t+N}$ may be output. In a nineth row, $e_{t+N}$ may be calculated to $X_{t+N} - P_t{}^{t+N} X_t$. In a tenth row, a gradient of a total loss value may be calculated.

Figure 2:
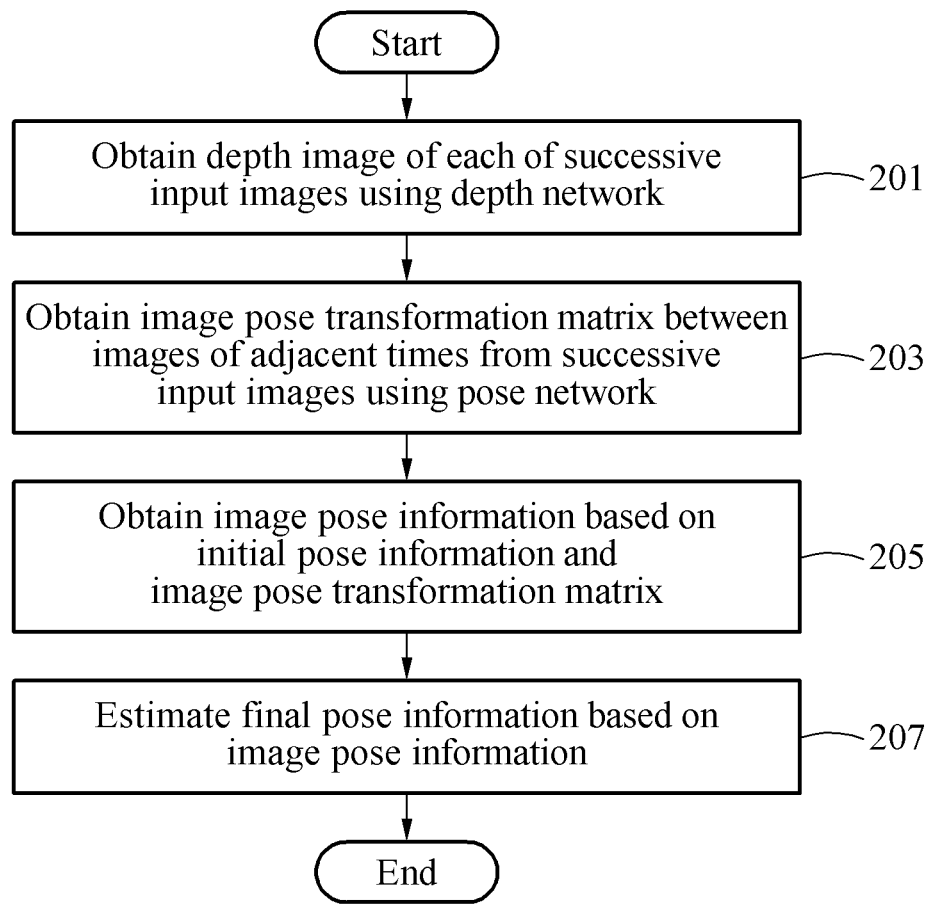
FIG. 2 illustrates an example of a method with pose estimation.

FIG. 2 illustrates an example of a method with pose estimation. The method will be hereinafter referred to as a pose information estimating method, only for simplicity of description and not for diminution in scope.

Referring to FIG. 2, in operation 201, a pose information estimating apparatus obtains a depth image of each of a plurality of successive input images using a depth network. The successive input images may be images captured from a monocular view. For example, an example pose information estimating apparatus may accurately estimate pose information of a camera even through a low-cost monocular camera is used instead of using an expensive stereo camera.

In operation 203, the pose information estimating apparatus obtains an image pose transformation matrix between images of adjacent time points from the successive input images using a pose network. The image pose transformation matrix may be a transformation matrix associated with pose information between successive frames in sequential order.

In operation 205, the pose information estimating apparatus obtains image pose information based on initial pose information and the image pose transformation matrix. The image pose information may refer to pose information that is estimated from an image sequence of the images using the pose network. The pose information estimating apparatus may estimate pose information of the camera at a subsequent time point by multiplying the initial pose information by the image pose transformation matrix.

In operation 207, the pose information estimating apparatus estimates depth information from the depth image and estimates final pose information based on the image pose information. The pose information estimating apparatus may estimate the final pose information by using the image pose information. For example, the pose information estimating apparatus may estimate the final pose information more accurately by adjusting the image pose information.

The pose network and the depth network may be trained in advance based on the image sequence and sensor position information. In a training process, an image pose transformation matrix between images of adjacent time points obtained from a plurality of successive training images may be accumulated. A pose loss value may be calculated by comparing image position information obtained from a result of the accumulating and sensor position information obtained from a sensor. Based on a result of recurrently calculating a gradient of the image position information included in the pose loss value, parameters of the pose network and the depth network may be learned.

The sensor may include a GPS and/or an indoor position sensor. The GPS may be suitable for the estimation of outside position information, and the indoor position sensor may be suitable for the estimation of precise inside position information. The sensor position information may be used as ground truth of an unlabeled image sequence. The sensor position information may be used to provide supervised learning to the pose network, which learning may be further propagated to the depth network, thereby improving the accuracy in estimating the depth image.

In another example, the pose information estimating apparatus may train online the depth network and the pose network. The depth network and the pose network may be trained through an image sequence and sensor position information that are collected during the use of a vehicle or a mobile terminal, as examples of the pose information estimating apparatus. The monocular camera and the position sensor may be components included in the vehicle or the mobile terminal, and thus the online training or learning may be performed.

In an online training process, the pose information estimating apparatus may obtain an image pose transformation matrix using the pose network. Additionally, the pose information estimating apparatus may obtain an inverse image pose transformation matrix between images of adjacent time points from the successive input images using the pose network.

The pose information estimating apparatus may calculate a composite loss value by comparing, to corresponding input image of each time point, a corresponding composite image of each time point generated using the appropriate image pose transformation matrix, an appropriate input image, appropriate depth map, as well as the inverse image pose transformation matrix, as discussed above with respect to operations 113 and 114 for the composite loss value 116 in FIG. 1. The composite loss value may reflect therein a photometric dissimilarity between an input image and the corresponding composite image.

The pose information estimating apparatus may calculate a pose loss value by comparing image position information, obtained from a result of accumulating an image pose transformation matrix, between images of adjacent time points and sensor position information obtained from a sensor. The sensor position information may be obtained in an absolute scale, and thus the absolute scale may be applied to a neural network trained with the sensor position information.

The pose information estimating apparatus may update the depth network and the pose network based on a total loss value calculated from the composite loss value and the pose loss value. The pose information estimating apparatus may calculate a gradient of the total loss value and train parameters of the neural network based on the calculated gradient. The pose information estimating apparatus may recurrently calculate a gradient of the image position information included in the pose loss value, and train or learn parameters of the depth network and the pose network based on a result of the calculating, e.g., which may include further training or learning (updating) the parameters of an already trained depth and pose networks.

Figure 3:
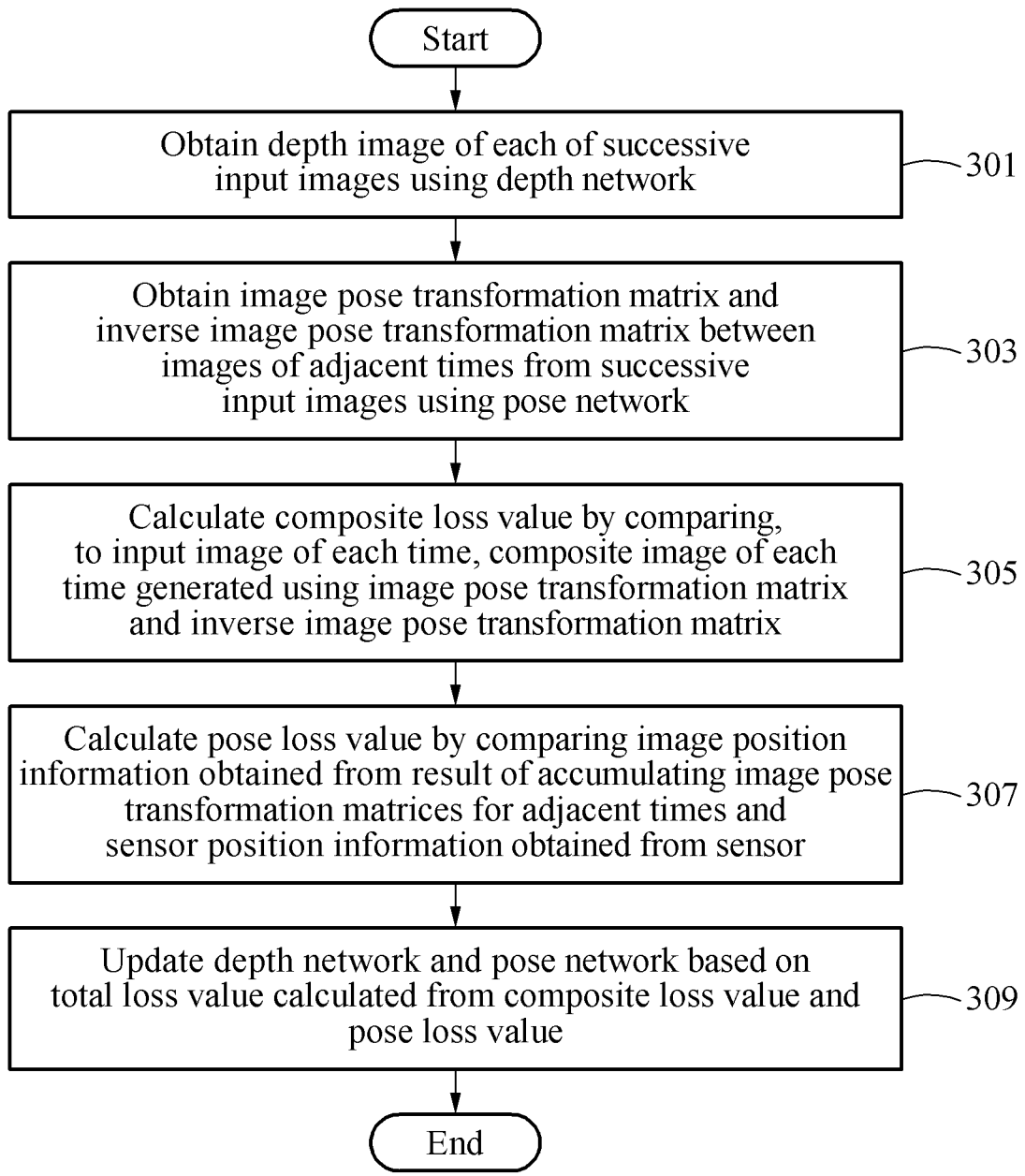
FIG. 3 illustrates an example of a method of training a neural network.

FIG. 3 illustrates an example of a method of training a neural network. The method of training a neural network will be referred to hereinafter as a neural network training method, only for simplicity of description and not for diminution in scope.

Referring to FIG. 3, in operation 301, a training apparatus obtains a depth image of each of a plurality of successive input images using a depth network. The successive input images may be images captured from a monocular view.

In operation 303, the training apparatus obtains an image pose transformation matrix and an inverse image pose transformation matrix between images of adjacent time points from the successive input images using a pose network. The image pose transformation matrix may be a transformation matrix associated with pose information between successive frames in sequential order. The inverse image pose transformation matrix may be a transformation matrix associated with pose information between successive frames in inverse order.

In operation 305, the training apparatus calculates a composite loss value by comparing, to an input image of each time with a composite image of each time generated using the image pose transformation matrix and the inverse image pose transformation matrix, such as discussed above with respect to FIG. 1. For example, the training apparatus may generate a composite image of a subsequent time point from a depth image of a subsequent time point and an input image of the current time point. The training apparatus may compare the generated composite image of the subsequent time with an input image at the subsequent time. The training apparatus may generate a composite image of the current time point from a depth image of the current time point and an input image of the subsequent time point. The training apparatus may compare the composite image of the current time with the input image at the current time. Thus, a composite loss value may be calculated to reflect therein a photometric dissimilarity between corresponding input images and corresponding composite images, e.g., such as described above with respect to FIG. 1.

In operation 307, the training apparatus calculates a pose loss value by comparing image position information obtained from a result of accumulating each of the image pose transformation matrices between adjacent time points, and sensor position information obtained from a sensor. The training apparatus may compare sets of position information obtained from synchronized heterogenous sensors. As an example of the adjacent time points, when the sensor captures sensor position information once every second, and 30 input images are captured every second, 30 image pose transform matrices may be accumulated and considered every time the sensor obtains a sensor position information.

As another example, the training apparatus may obtain the sensor position information from sensor information at two time points with an interval of a sensing period therebetween. The training apparatus may obtain the image position information by accumulating image pose transformation matrices for adjacent time points during the sensing period, and may calculate the corresponding pose loss value by comparing the sensor position information with the image position information calculated based on the accumulated image pose transformation matrices.

For example, the training apparatus may obtain a cumulative transformation matrix by, for each adjacent time point during a particular sensing period, multiplying each image pose transformation matrix of a current time point by the cumulative transformation matrix calculated in the previous time point, e.g., where an initial time point of the sensing period may consider the image pose transformation matrix of the initial time point to be the cumulative image pose transformation matrix for the initial time point, and then the image pose transformation matrix of the next time point would be multiplied by the cumulative image pose transformation matrix of the initial time point, etc., until a final image pose transformation matrix of a final time point of the sensing period would be multiplied by the cumulative image pose transformation matrix of the previous time point to calculate the cumulative transformation matrix for the sensing period. In such an example, the training apparatus may obtain the image position information by multiplying the initial position information and the cumulative transformation matrix of the sensing period. The training apparatus may also obtain a sensor pose transformation matrix from sensor information for the two time points with the sensing period therebetween. The training apparatus may obtain the sensor position information by multiplying the initial position information and the sensor pose transformation matrix.

In operation 309, the training apparatus updates the parameters of the depth network and the pose network based on a total loss value calculated from the composite loss value and the pose loss value. The training apparatus may calculate the total loss value by calculating a weighted average of the composite loss value and the pose loss value. The training apparatus may calculate a gradient of the total loss value. The training apparatus may thus update the parameters of the depth network and parameters of the pose network such that the gradient of the total loss value decreases.

The training apparatus may calculate a gradient of the pose loss value. The training apparatus may recurrently calculate a gradient of the image position information included in the pose loss value. The training apparatus may calculate the gradient of the total loss value by calculating a weighted average of the gradient of the pose loss value and a gradient of the composite loss value.

The training apparatus may recurrently calculate the pose loss value. For example, the training apparatus may input a first input image of a first time point and a second input image of a second time point to the pose network, and obtain an image pose transformation matrix from the first time point toward the second time point. The training apparatus may obtain a gradient of the image pose transformation matrix from the first time point toward the second time point. The training apparatus may obtain a gradient of image position information of the second time point based on image position information of the first time point, the gradient of the image pose transformation matrix from the first time point toward the second time point, the image pose transformation matrix from the first time point toward the second time point, and a gradient of the image position information of the first time point. The training apparatus may obtain the image position information of the second time point by multiplying the image position information of the first time point by the image pose transformation matrix from the first time point toward the second time point.

Figure 4:
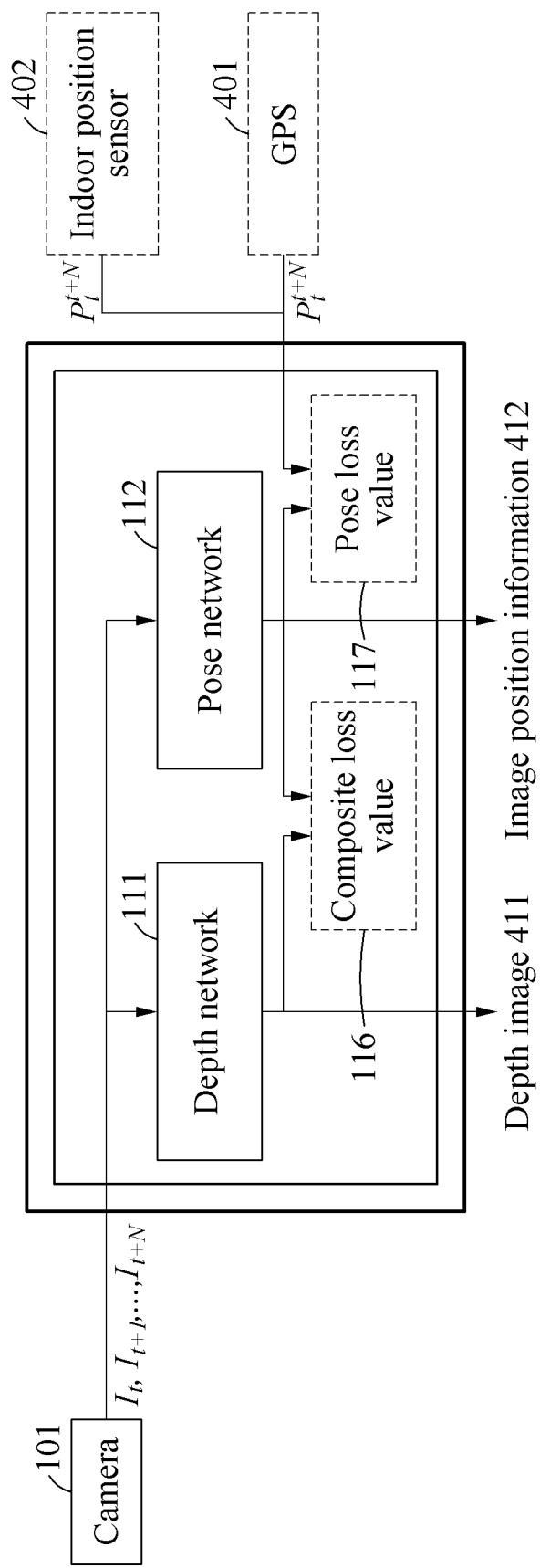
FIG. 4 illustrates an example of estimating pose information and corresponding performing of training by an apparatus.

FIG. 4 illustrates an example of estimating pose information and corresponding performing of training of an apparatus.

In an example, a pose information estimating apparatus may receive successive images from a camera 101 and estimate pose information of a camera 101. The pose information estimating apparatus may obtain a depth image 411 and image position information 412 respectively using a depth network 111 and a pose network 112 that are trained in advance. The pose information estimating apparatus may estimate accurate final pose information by adjusting the image position information 412 using the depth image 411.

The depth network 111 and the pose network 112 may be trained in advance based on an image sequence and sensor position information. In an offline training (or learning) operation, an image pose transformation matrix between images of adjacent time points obtained from a plurality of successive training images may be accumulated. The accumulated image pose transformation matrix may be synchronized with a sensor pose transformation matrix. In an operation 117 of calculating a pose loss value, the pose loss value may be calculated by comparing image position information obtained from the accumulated image pose transformation matrix and sensor position information obtained from the sensor pose transformation matrix.

In an operation 116 of calculating a composite loss value, a composite image may be generated using depth information, an input image, and an image pose transformation matrix, and the composite image may be compared to an original input image. A neural network may be trained by calculating gradients of the composite loss value and the pose loss value. The operation 117 of calculating the pose loss value may include the accumulated image pose transformation matrix. Here, a gradient of the accumulated image pose transformation matrix may be recurrently calculated.

A sensor that outputs the sensor position information may include a GPS 401 or an indoor position sensor 402. The indoor position sensor 402 may measure an actual position change, as in a beacon system, for example. For example, the indoor position sensor 402 may measure an accurate inside position using a floor plan indicating an indoor structure and an algorithm for estimating a current position of the camera 101. For example, in a case in which a pattern such as a QR code is arranged in a place of which a position is known, it is possible to verify a current position of the camera 101 by capturing the pattern.

In another example, the pose information estimating apparatus may train or learn online the depth network 111 and the pose network 112. The depth network 111 and the pose network 112 may be trained through an image sequence and sensor position information that are collected during the use of the corresponding vehicle or mobile terminal, e.g., when the pose information estimating apparatus is the vehicle or mobile terminal.

Figure 5:
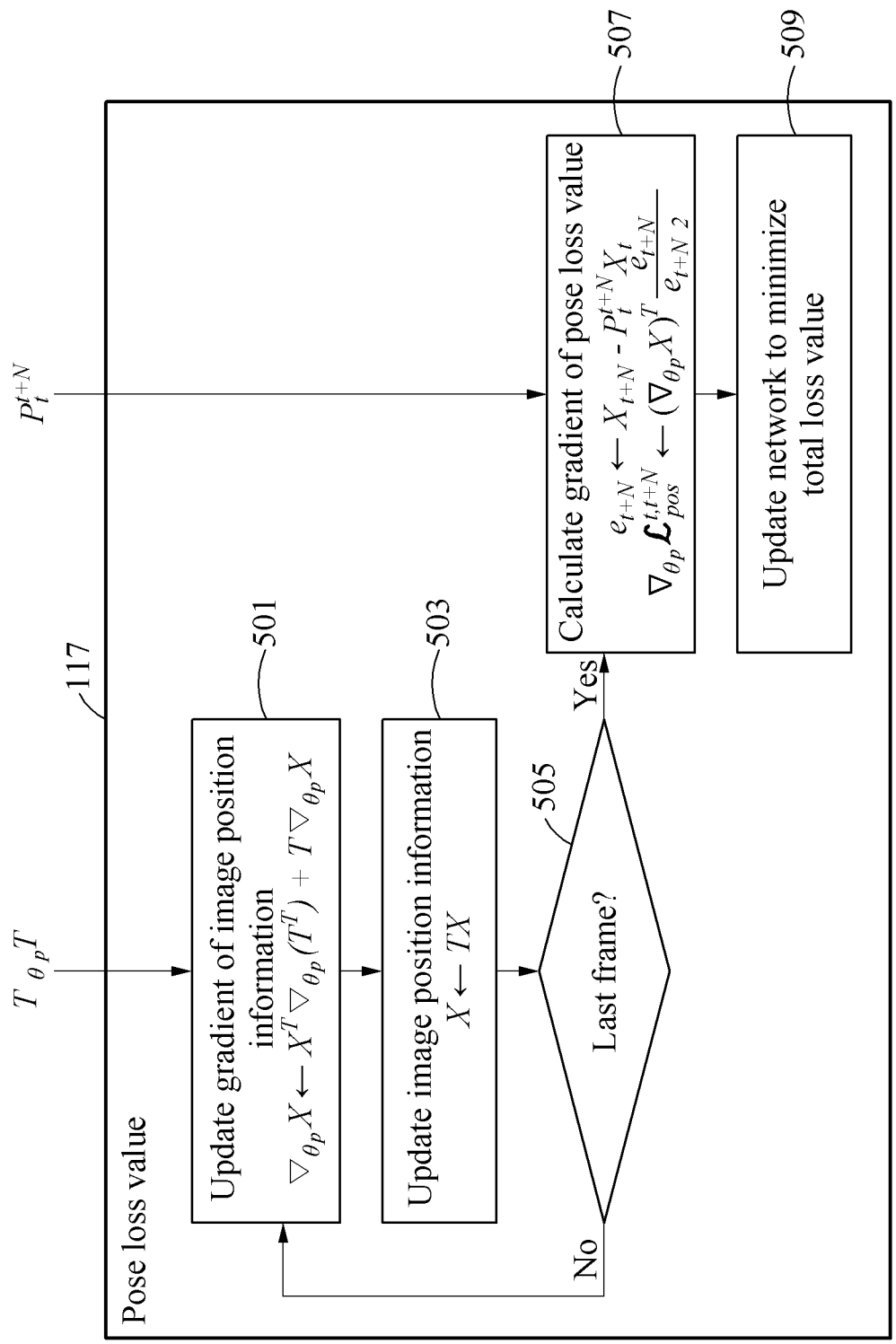
FIG. 5 illustrates an example of calculating a pose loss value in a process of training an apparatus.

FIG. 5 illustrates an example of calculating a pose loss value in a process of training an apparatus. Below, for connivance of explanation, an operation 117 of FIG. 5 may correspond to the operation 117 of FIGS. 1 and/or 4.

Referring to FIG. 5, in the operation 117 of calculating a pose loss value, a pose network outputs T, $\square_{\theta_p}T$ from input images of adjacent time points. In operation 501, a gradient $\square_{\theta_p}X$ of image position information is updated to $X^T\square_{\theta_p}(T^{-1}) + T\square_{\theta_p}X$. In operation 503, image position information X is updated to image position information TX of a subsequent time point.

In operation 505, whether an input image is a last frame is determined. When the input image is not the last frame, operations 501 and 503 may be performed repeatedly. In operation 507, when the input image is the last frame, $e_{t+N}$ is updated to a difference between image position information $X_{t+N}$ and sensor position information $P_t^{t+N}X_t$. Subsequently, a gradient of a pose loss value may be finally calculated through Equation 4 described above with reference to FIG. 1. In operation 509, a gradient of a total loss value is calculated, and the parameters of the pose network may be updated such that the total loss value is minimized.

Figure 6:
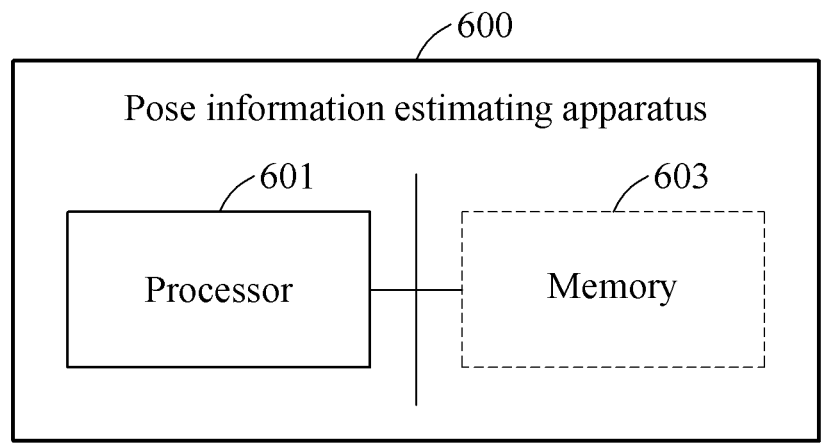
FIG. 6 illustrates an example apparatus with pose estimation.

FIG. 6 illustrates an example apparatus with pose estimation.

Referring to FIG. 6, a pose information estimating apparatus 600 includes at least one processor 601. The pose information estimating apparatus 600 further includes a memory 603. A depth network and a pose network may be implemented by the processor, and the parameters of the respective networks, e.g., weights of a depth neural network and weights of a pose network, may be stored in the memory 603, and/or stored a specialized chip, as the processor 601 is representative of one or more processors as well as one or more processors and/or one or more accelerators or neural network processors, as non-limiting examples.

For example, the processor 601 may obtain a depth image of each of a plurality of successive input images using the depth network. The processor 601 may obtain an image pose transformation matrix between images of adjacent time points from the successive input images using the pose network. The processor 601 may obtain image pose information based on initial pose information and the image pose transformation matrix. The processor 601 may estimate final pose information based on the depth image and the image pose information.

The depth network and the pose network may be trained in advance in an offline training process. In the offline training process, an image pose transformation matrix between images of adjacent time points obtained from a plurality of successive training images may be accumulated. A pose loss value may be calculated by comparing image position information obtained from a result of the accumulating and sensor position information obtained from a sensor. The depth network and the pose network may be trained based on a result of recurrently calculating a gradient of the image position information included in the pose loss value. The sensor used in the training process may include a GPS or an indoor position sensor.

In another example or in addition to the offline training process, the pose information estimating apparatus 600 may perform online training. The processor 601 may obtain an inverse image pose transformation matrix between the images of the adjacent time points from the successive input images using the pose network. The processor 601 may calculate a composite loss value by comparing, to an input image of each time point, a composite image of each time point generated using the image pose transformation matrix and the inverse image pose transformation matrix. The processor 601 may calculate a pose loss value by comparing the image position information obtained from a result of accumulating the image pose transformation matrix between the images of the adjacent time points and the sensor position information obtained from the sensor. The processor 601 may update the parameters of the depth network and the pose network based on a total loss value calculated from the composite loss value and the pose loss value.

Figure 7:
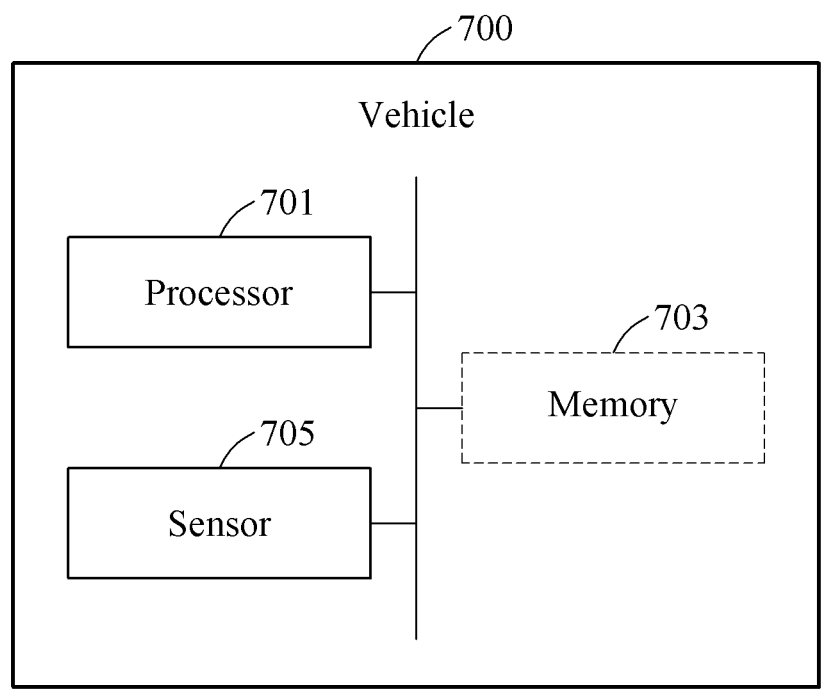
FIG. 7 illustrates an example vehicle as an apparatus with pose estimation.

FIG. 7 illustrates an example vehicle as an apparatus with pose estimation.

Referring to FIG. 7, a vehicle 700 includes at least one processor 701. The vehicle 700 further includes a memory 703 and/or a sensor 705. The sensor 705 may include a GPS or an indoor position sensor, for example.

The processor 701 may obtain a depth image of each of a plurality of successive input images using a depth network. The processor 701 may obtain an image pose transformation matrix between images of adjacent time points from the successive input images using a pose network. The processor 701 may obtain image pose information based on initial pose information and the image pose transformation matrix. The processor 701 may estimate final pose information based on the depth image and the image pose information.

The depth network and the pose network may be trained in advance in an offline training process. In the offline training process, an image pose transformation matrix between images of adjacent time points obtained from a plurality of successive training images may be accumulated. A pose loss value may be calculated by comparing image position information obtained from a result of the accumulating and sensor position information obtained from a sensor (e.g., the sensor 705). The depth network and the pose network may be trained based on a result of recurrently calculating a gradient of the image position information included in the pose loss value.

In another example, the processor 701 may additionally or alternately perform online training. The processor 701 may obtain an inverse image pose transformation matrix between the images of the adjacent time points from the successive input images using the pose network. The processor 701 may calculate a composite loss value by comparing, to an input image of each time, a composite image of each time point generated using the image pose transformation matrix and the inverse image pose transformation matrix. The processor 701 may calculate a pose loss value by comparing the image position information obtained from a result of accumulating the image pose transformation matrix between the images of the adjacent time points and the sensor position information obtained from the sensor 705. The processor 701 may update the parameters of the depth network and the pose network based on a total loss value calculated from the composite loss value and the pose loss value.

The pose information estimating apparatus, the training apparatus, the cameras, the sensors, and memories and other apparatuses, devices, units, modules, and components described herein with respect to FIGS. 1-7 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods of FIGS. 1-7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented method, comprising:
obtaining, using a depth network, a respective depth image for each of a plurality of successive input images obtained from a camera;
obtaining, using a pose network, respective image pose transformation matrices between images, of the successive input images, at adjacent time points;
obtaining, based on initial pose information and the respective image pose transformation matrices, image pose information for each of the adjacent times;
estimating final pose information dependent on the obtained image pose information for each of the adjacent times;
accumulating the image pose transformation matrices; and
calculating a pose loss value based on a result of comparing image position information, obtained from a result of the accumulating, and sensor position information obtained from a sensor comprising either one or both of a global positioning system (GPS) and an indoor position sensor.

2. The method of claim 1, further comprising training the pose network dependent on the calculated pose loss value.

3. The method of claim 2, further comprising training the depth network dependent on the calculated pose loss value.

4. The method of claim 3, further comprising recurrently calculating a gradient of the image position information included in the pose loss value, wherein the training of the pose network and the training of the depth network are both dependent on the recurrently calculated gradient.

5. The method of claim 1,
wherein the obtaining, using the pose network, of the respective image pose transformation matrices includes obtaining respective image pose transformation matrices between pairs of images at corresponding adjacent time points from the successive input images, and obtaining respective inverse image pose transformation matrices between the pairs of images, and the method further comprises:
calculating a composite loss value based on respective comparisons for each time point of a corresponding input image and a composite image generated using a corresponding inverse image pose transformation matrix applied to a successive image of the corresponding image, and respective comparisons for each time point of the successive image and a composite image generated using a corresponding image pose transformation matrix applied to the corresponding image; and updating training of the depth network and the pose network based on a total loss value calculated from the composite loss value and the pose loss value.

6. The method of claim 1,
wherein the method is a method of a vehicle, and the sensor is a position sensor of the vehicle,
wherein the method further comprise repeating, for each of a plurality of position samplings of the position sensor, the obtaining of the respective depth images, the obtaining of the respective image pose transformation matrices, the obtaining of the image pose information, and the calculating of the pose loss value, and
wherein the method further comprises generating the pose network by updating training, of a previous pose network, dependent on a result of one of the repeated calculating of the pose loss value that is based on a corresponding one of the plurality of position samplings.

7. The method of claim 6, wherein the updating of the training of the previous pose network is performed offline or online.

8. The method of claim 6, wherein the vehicle controls operations of the vehicle dependent at least on the estimated final pose information.

9. The method of claim 1, wherein the vehicle controls operations of the vehicle dependent at least on the estimated final pose information.

10. A non-transitory computer-readable storage medium storing instructions that, when executed by a processor, cause the processor to perform the method of claim 1.

11. A processor-implemented method, comprising:
obtaining, using a depth network, a respective depth image for each of a plurality of successive input images obtained from a camera;
obtaining, using a pose network, respective image pose transformation matrices, and respective inverse image pose transformation matrices, between images, of the successive input images, at adjacent time points;
calculating a composite loss value based on respective comparisons for each time point of a corresponding input image and a composite image generated using a corresponding inverse image pose transformation matrix applied to a successive image of the corresponding image, and respective comparisons for each time point of the successive image and a composite image generated using a corresponding image pose transformation matrix applied to the corresponding image;
calculating a pose loss value based on a result of comparing image position information, obtained from a result of an accumulating of the image pose transformation matrices, and sensor position information obtained from a sensor comprising either one or both of a global positioning system (GPS) and an indoor position sensor; and updating training of the depth network and the pose network based on a total loss value calculated from the composite loss value and the pose loss value.

12. The method of claim 11, wherein the calculating of the pose loss value comprises:
obtaining the sensor position information from sensor information at two time points, with an interval of a sensing period being between the two time points;
obtaining the image position information by performing the accumulating of the image pose transformation matrices during the sensing period; and
calculating the pose loss value by comparing the sensor position information and the obtained image position information.

13. The method of claim 12, wherein the obtaining of the sensor position information comprises:
obtaining a sensor pose transformation matrix from the sensor information at the two time points; and
obtaining the sensor position information by multiplying initial position information and the sensor pose transformation matrix.

14. The method of claim 12, wherein the obtaining of the image position information comprises:
obtaining a cumulative transformation matrix by cumulatively multiplying the image pose transformation matrices at the adjacent time points; and
obtaining the image position information by multiplying the initial position information and the cumulative transformation matrix.

15. The method of claim 11, wherein the updating comprises:
calculating the total loss value by calculating a weighted average of the composite loss value and the pose loss value;
calculating a gradient of the total loss value; and
updating the training of the depth network and the pose network such that the gradient of the total loss value decreases.

16. The method of claim 15, wherein the calculating of the gradient of the total loss value comprises:
calculating a gradient of the pose loss value; and
calculating the gradient of the total loss value by calculating a weighted average of the gradient of the pose loss value and a gradient of the composite loss value.

17. The method of claim 16, wherein the calculating of the gradient of the pose loss value comprises:
recurrently calculating a gradient of the image position information included in the pose loss value.

18. The method of claim 17, wherein the recurrent calculating comprises:
obtaining an image pose transformation matrix from a first time point toward a second time point by inputting a first input image of the first time point and a second input image of the second time point to the pose network;
obtaining a gradient of the image pose transformation matrix from the first time point toward the second time point;
obtaining a gradient of image position information of the second time point based on image position information of the first time point, the gradient of the image pose transformation matrix from the first time point toward the second time point, the image pose transformation matrix from the first time point toward the second time point, and a gradient of the image position information of the first time point; and obtaining the image position information of the second time point by multiplying the image position information of the first time point by the image pose transformation matrix from the first time point toward the second time point.

19. A non-transitory computer-readable storage medium storing instructions that, when executed by a processor, cause the processor to perform the method of claim 11.

20. An apparatus, the apparatus comprising:
a position sensor comprising either one or both of a global positioning system (GPS) and an indoor position sensor; and
one or more processors configured to:
  obtain, using a depth network, a respective depth image for each of a plurality of successive input images obtained from a camera;
  obtain, using a pose network, respective image pose transformation matrices between images, of the successive input images, at adjacent time points;
  obtain, based on initial pose information and the respective image pose transformation matrices, image pose information for each of the adjacent times;
  estimate final pose information dependent on the obtained image pose information for each of the adjacent times;
  accumulate the image pose transformation matrices; and
  calculate a pose loss value based on a result of comparing image position information, obtained from a result of the accumulating, and sensor position information obtained from the position sensor.

21. The apparatus of claim 20, wherein the one or more processors are further configured to train the pose network dependent on the calculated pose loss value.

22. The apparatus of claim 21, wherein the one or more processors are further configured to train the depth network dependent on the calculated pose loss value.

23. The apparatus of claim 20,
wherein the apparatus is a vehicle, and
wherein the one or more processors are further configured to:
  repeat, for each of a plurality of position samplings of the position sensor, the obtaining of the respective depth images, the obtaining of the respective image pose transformation matrices, the obtaining of the image pose information, and the calculating of the pose loss value; and
  generate the pose network by updating training, of a previous pose network, dependent on a result of one of the repeated calculating of the pose loss value that is based on a corresponding one of the plurality of position samplings.

24. The apparatus of claim 20, wherein the one or more processors are configured to:
  for the obtaining of the respective image pose transformation matrices obtain respective image pose transformation matrices between pairs of images at corresponding adjacent time points from the successive input images, and obtain respective inverse image pose transformation matrices between the pairs of images;
  calculate a composite loss value based on respective comparisons for each time point of a corresponding input image and a composite image generated using a corresponding inverse image pose transformation matrix applied to a successive image of the corresponding image, and respective comparisons for each time point of the successive image and a composite image generated using a corresponding image pose transformation matrix applied to the corresponding image; and
  update training of the depth network and the pose network based on a total loss value calculated from the composite loss value and the pose loss value.

25. A vehicle, the vehicle comprising:
a position sensor comprising either one or both of a global positioning system (GPS) and an indoor position sensor; and
one or more processors configured to:
  with respect to each of a plurality of position samplings by the position sensor, repeat:
    an obtaining, using a pose network, of respective image pose transformation matrices, and respective inverse image pose transformation matrices, between images of a plurality of input images obtained from a camera;
    an obtaining of image pose information dependent on the respective image pose transformation matrices;
    a calculating of a composite loss value dependent on the respective image pose transformation matrices, the respective inverse image pose transformation matrices, the plurality of input images, and respective depth images for the plurality of input images;
    an obtaining of image position information dependent on a result of an accumulating of the respective image pose transformation matrices; and
    a calculation of a pose loss value dependent on the obtained image position information and sensor position information from the position sensor; and
  update training of the pose network dependent on a result of one of the repeated calculations of the composite loss value and the pose loss value for a corresponding one of the plurality of position samplings.

* * * * *